United States Patent
Morikawa et al.

(10) Patent No.: US 10,091,398 B2
(45) Date of Patent: Oct. 2, 2018

(54) IMAGE PROCESSING APPARATUS CAPABLE OF SETTING CHARACTERISTIC INFORMATION FOR CONVERTING TARGET IMAGE DATA

(71) Applicant: BROTHER KOGYO KABUSHIKI KAISHA, Nagoya, Aichi (JP)

(72) Inventors: Shota Morikawa, Nagoya (JP); Takuya Shimahashi, Nagoya (JP); Akidi Yoshida, Nagoya (JP); Kazuyuki Miyaki, Ichinomiya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/472,689

(22) Filed: Mar. 29, 2017

(65) Prior Publication Data
US 2017/0289408 A1 Oct. 5, 2017

(30) Foreign Application Priority Data
Mar. 30, 2016 (JP) ................. 2016-069045

(51) Int. Cl.
*H04N 1/60* (2006.01)
*H04N 1/50* (2006.01)
(Continued)

(52) U.S. Cl.
CPC ......... *H04N 1/6058* (2013.01); *G06F 3/1219* (2013.01); *G06F 3/1239* (2013.01);
(Continued)

(58) Field of Classification Search
CPC .......... H04N 1/2346; H04N 1/56; H04N 1/60; H04N 1/6008; H04N 1/6058;
(Continued)

(56) References Cited

U.S. PATENT DOCUMENTS

| 6,324,356 | B1  |   11/2001 | Inoue |
| 8,243,335 | B2* |    8/2012 | Nagai ...................... H04N 1/603 358/1.9 |
| 8,335,016 | B2* |   12/2012 | Nishikata ............... G03G 15/50 358/1.9 |
| 8,467,093 | B2* |    6/2013 | Komatsu ............... G06F 3/1219 358/1.13 |
| 8,780,424 | B2* |    7/2014 | Yamada ............. H04N 1/00018 358/1.9 |
| 8,885,214 | B2* |   11/2014 | Saiki .................... H04N 1/6027 358/1.15 |
| 9,674,403 | B2* |    6/2017 | Morovic .............. H04N 1/6019 |

(Continued)

FOREIGN PATENT DOCUMENTS

JP   H08-108548 A   4/1996
JP   2001-194855 A  7/2001
(Continued)

*Primary Examiner* — Scott A Rogers
(74) *Attorney, Agent, or Firm* — Scully, Scott, Murphy & Presser, PC

(57) ABSTRACT

An image processing apparatus includes a controller configured to perform: setting characteristic information including first characteristic information and second characteristic information; and converting a target image data using the characteristic information. The first and second characteristic information correlate input values with output values in a specific color space. The input values includes a specific input value within a specific range. The specific input value is correlated with a first specific output value by the first characteristic information, and is correlated with a second specific output value by the second characteristic information. The first specific output value indicates that a colorant consumption quantity for the specific input value is changed from an original colorant consumption quantity by a first colorant quantity. The second specific output value indicates that the colorant consumption quantity is changed from the original colorant consumption quantity by a second colorant quantity different from the first colorant quantity.

10 Claims, 8 Drawing Sheets

(51) Int. Cl.
*G06K 15/02* (2006.01)
*G06F 3/12* (2006.01)
*H04N 1/23* (2006.01)
*G06K 15/00* (2006.01)

(52) U.S. Cl.
CPC ....... *G06K 15/1878* (2013.01); *G06K 15/407* (2013.01); *H04N 1/2346* (2013.01); *H04N 1/6008* (2013.01); *H04N 2201/0094* (2013.01)

(58) Field of Classification Search
CPC ............ G06K 15/407; G06K 15/4075; G06K 15/1878; G06F 3/1218; G06F 3/1219; G06F 3/1237; G06F 3/1239
See application file for complete search history.

(56) References Cited

U.S. PATENT DOCUMENTS

| | | | | |
|---|---|---|---|---|
| 9,925,794 | B2* | 3/2018 | Miyaki | B41J 2/2103 |
| 2017/0286024 | A1* | 10/2017 | Morikawa | G06F 3/1219 |
| 2018/0007238 | A1* | 1/2018 | Shimahashi | H04N 1/6063 |

FOREIGN PATENT DOCUMENTS

| | | |
|---|---|---|
| JP | 2006-123200 A | 5/2006 |
| JP | 2007-292871 A | 11/2007 |
| JP | 2014-162005 A | 9/2014 |

* cited by examiner

IMAGE PROCESSING APPARATUS CAPABLE OF SETTING CHARACTERISTIC INFORMATION FOR CONVERTING TARGET IMAGE DATA

CROSS REFERENCE TO RELATED APPLICATION

This application claims priority from Japanese Patent Application No. 2016-069045 filed Mar. 30, 2016. The entire content of the priority application is incorporated herein by reference.

TECHNICAL FIELD

The present disclosure relates to an image processing apparatus.

BACKGROUND

Technologies have been proposed for adjusting the consumption of colorants when generating data for printing an image. For example, the consumption of colorants is adjusted on the basis of residual amounts of colorants in the printer or the amounts of colorants that will be consumed when printing the image.

SUMMARY

However, some colors in an image represented by print data might be converted to undesirable colors when adjusting the consumption amounts of the colorants.

In view of the foregoing, it is an object of the present disclosure to provide a technology capable of outputting a printed image in suitable colors while adjusting the consumption amounts of colorants.

In order to attain the above and other objects, according to one aspect, the disclosure provides an image processing apparatus including a controller. The controller is configured to perform: acquiring target image data representing a target image to be printed by a printer using a plurality of types of colorant, the target image data including a plurality of pixels, the plurality of types of colorant including a first colorant and a second colorant; acquiring a plurality of color component values in a specific color space of each of the plurality of pixels from the target image data, the specific color space being represented by a plurality of color components corresponding to respective ones of the plurality of types of colorant, the plurality of color components including a first color component corresponding to the first colorant and a second color component corresponding to the second colorant, the plurality of color component values including a first color component value for the first color component and a second color component value for the second color component; specifying a distribution of color values of the plurality of pixels in the target image data by analyzing the target image data; setting a specific range with respect to the plurality of color component values on the basis of the distribution of color values; specifying a plurality of index values corresponding to respective ones of the plurality of types of colorant, each of the plurality of index values being related to a quantity of corresponding type of colorant, the plurality of index values including a first index value and a second index value, the first index value being related to a quantity of the first colorant, the second index value being related to a quantity of the second colorant; setting characteristic information including first characteristic information and second characteristic information which correlate input values in the specific color space with output values in the specific color space on a one-to-one basis, the input values including a specific input value within the specific range, the specific input value being correlated with a first specific output value by the first characteristic information, the specific input value being correlated with a second specific output value by the second characteristic information, the first specific output value indicating that a colorant consumption quantity for the specific input value is changed from an original colorant consumption quantity for the specific input value by a first colorant quantity, the original colorant consumption quantity being a colorant consumption quantity when assuming that each of the output values is in coincidence with corresponding input value, the second specific output value indicating that the colorant consumption quantity for the specific input value is changed from the original colorant consumption quantity for the specific input value by a second colorant quantity different from the first colorant quantity, at least one of the first characteristic information and the second characteristic information being set on the basis of the specific range in the setting the characteristic information; and converting the target image data using the characteristic information for generating print data, the print data being supplied to the printer, the converting the target image data including changing the plurality of color component values of each of the plurality of pixels in the target image, the changing the plurality of color component values including: changing the first color component value of each of the plurality of pixels as the input value to a first output color component value as the output value according to the first characteristic information; and changing, when the second index value indicates that the quantity of the second colorant differs from the quantity of the first colorant, the second color component value of each of the plurality of pixels as the input value to a second output color component value as the output value according to the second characteristic information.

According to another aspect, the disclosure provides a non-transitory computer readable storage medium storing a set of program instructions for an image processing apparatus including a controller. The set of program instructions, when executed by the controller, causes the image processing apparatus to perform: acquiring target image data representing a target image to be printed by a printer using a plurality of types of colorant, the target image data including a plurality of pixels, the plurality of types of colorant including a first colorant and a second colorant; acquiring a plurality of color component values in a specific color space of each of the plurality of pixels from the target image data, the specific color space being represented by a plurality of color components corresponding to respective ones of the plurality of types of colorant, the plurality of color components including a first color component corresponding to the first colorant and a second color component corresponding to the second colorant, the plurality of color component values including a first color component value for the first color component and a second color component value for the second color component; specifying a distribution of color values of the plurality of pixels in the target image data by analyzing the target image data; setting a specific range with respect to the plurality of color component values on the basis of the distribution of color values; specifying a plurality of index values corresponding to respective ones of the plurality of types of colorant, each of the plurality of index values being related to a quantity of corresponding type of colorant, the plurality of index values including a first index value and a second index value, the first index value being related to a quantity of the first colorant, the second index value being related to a quantity of the second colorant; setting characteristic information including first characteristic information and second characteristic information which correlate input values in the specific color space with output values in the specific color space on a one-to-one basis, the input values including a specific input value within the specific range, the specific input value being correlated with a first specific output value by the first characteristic information, the specific input value being correlated with a second specific output value by the second characteristic information, the first specific output value indicating that a colorant consumption quantity for the specific input value is changed from an original colorant consumption quantity for the specific input value by a first colorant quantity, the original colorant consumption quantity being a colorant consumption quantity when assuming that each of the output values is in coincidence with corresponding input value, the second specific output value indicating that the colorant consumption quantity for the specific input value is changed from the original colorant consumption quantity for the specific input value by a second colorant quantity different from the first colorant quantity, at least one of the first characteristic information and the second characteristic information being set on the basis of the specific range in the setting the characteristic information; and converting the target image data using the characteristic information for generating print data, the print data being supplied to the printer, the converting the target image data including changing the plurality of color component values of each of the plurality of pixels in the target image, the changing the plurality of color component values including: changing the first color component value of each of the plurality of pixels as the input value to a first output color component value as the output value according to the first characteristic information; and changing, when the second index value indicates that the quantity of the second colorant differs from the quantity of the first colorant, the second color component value of each of the plurality of pixels as the input value to a second output color component value as the output value according to the second characteristic information.

BRIEF DESCRIPTION OF THE DRAWINGS

The particular features and advantages of the disclosure will become apparent from the following description taken in connection with the accompanying drawings, in which.

DETAILED DESCRIPTION

A. First Embodiment

Figure 1:
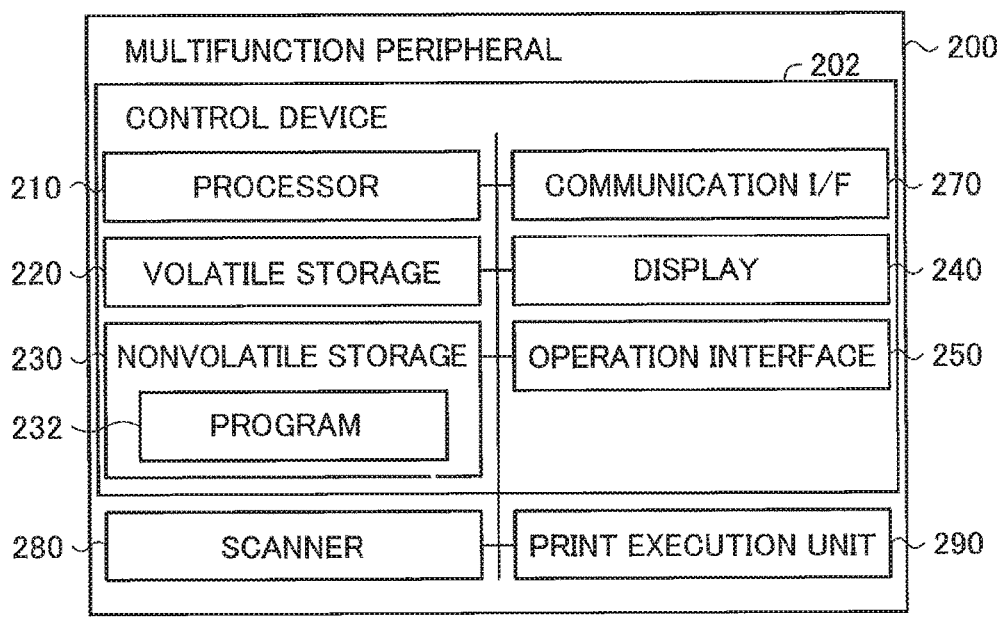
FIG. 1 is a block diagram illustrating a multifunction peripheral according to an embodiment.

FIG. 1 is a block diagram illustrating a multifunction peripheral 200 according to an embodiment. The multifunction peripheral 200 has a control device 202, a scanner 280, and a print execution unit 290. The control device 202 has a processor 210, a volatile storage 220, a nonvolatile storage 230, a display 240, an operation interface 250, and a communication interface 270. All of these components are interconnected via a bus.

The processor 210 is a CPU, for example, for performing data processes. The volatile storage 220 is DRAM, for example, and the nonvolatile storage 230 is flash memory, for example.

The nonvolatile storage 230 stores programs 232. By executing the programs 232, the processor 210 implements various functions (described later in detail). The processor 210 temporarily stores various intermediate data for use when executing the programs 232 in a storage device such as the volatile storage 220 or nonvolatile storage 230. In the present embodiment, the manufacturer of the multifunction peripheral 200 pre-stores the program 232 in the nonvolatile storage 230 as firmware. However, the multifunction peripheral 200 may be configured to acquire at least some of the programs 232 externally and to store these programs in the nonvolatile storage 230. For example, the processor 210 may acquire some of the programs 232 from an external server (not illustrated) in response to a user command, and may store the acquired programs in the nonvolatile storage 230.

The display 240 is a liquid crystal display, for example, that functions to display images. The operation interface 250 is an interface capable of receiving operations performed by the user, and may be a touchscreen placed over the display 240, for example. By operating the operation interface 250, the user can input various instructions into the multifunction peripheral 200.

The communication interface 270 is an interface capable of communicating with other devices, such as a USB interface, a wired LAN interface, or the IEEE 802.11 wireless interface.

The scanner 280 produces scan data representing a scanned image by optically reading a document or other target material using a photoelectric conversion element such as a CCD or CMOS. The print execution unit 290 prints images on paper according to a prescribed method (inkjet or laser printing method, for example). In the present embodiment, the print execution unit 290 is an inkjet printing device capable of printing color images using ink in the four colors cyan (C), magenta (M), yellow (Y), and black (K).

The control device 202 (specifically, the processor 210 in the present embodiment) is capable of controlling, in response to a user command, the print execution unit 290 to print images based on target image data (hereinafter simply called "target data") specified by the user. Also, the control device 202 is capable of driving, in response to a user command, the scanner 280 to optically read a target in order to generate document data representing the target. Next, a printing process will be described in which the control device 202 controls the print execution unit 290 to print images based on target data specified by the user.

Figure 2:
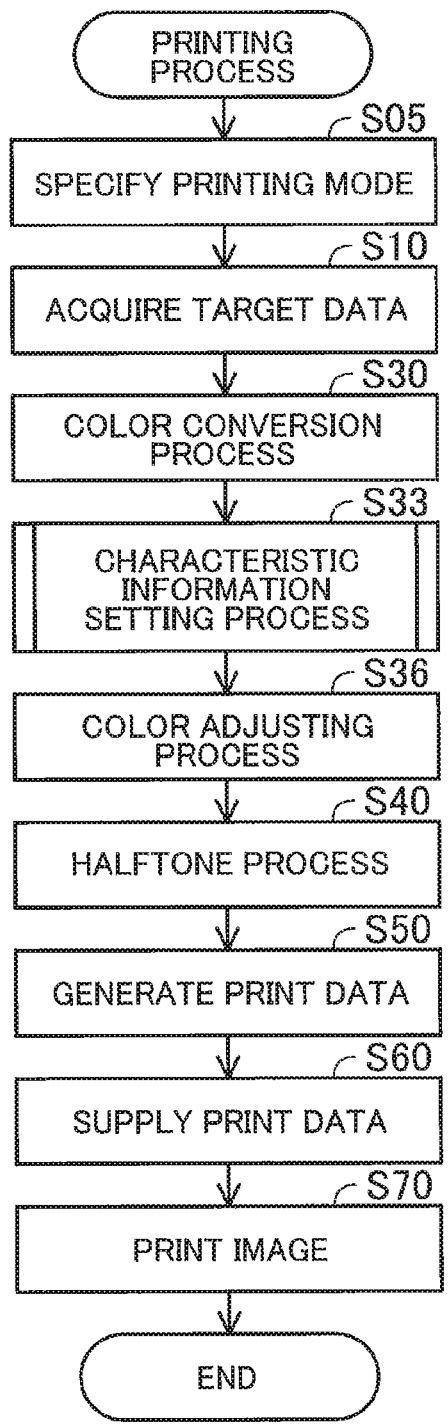
FIG. 2 is a flowchart illustrating an example of a printing process.

FIG. 2 is a flowchart illustrating an example of a printing process. The processor 210 of the multifunction peripheral 200 begins this printing process when the user inputs a print command into the operation interface 250, for example. In the present embodiment, a print command includes an instruction specifying target data to be used for printing, and an instruction specifying a printing mode. Any storage device may be employed for storing target data. For example, data stored in the nonvolatile storage 230 may be specified as the target data. Alternatively, data stored in another device (removable memory, for example) connected to the communication interface 270 may be specified as the target data. The printing mode can be set to either a high-quality mode or a conservation mode. The high-quality mode suppresses the consumption of colorant while emphasizing image quality. The conservation mode reduces or saves the consumption of colorant more than the high-quality mode. In S05 of FIG. 2, the processor 210 specifies the printing mode designated by the print command that the user inputted via the operation interface 250. In S10 the processor 210 acquires target data designated by the print command. In the present embodiment, target data is RGB bitmap data. The target image represented by the target data is expressed in RGB gradation values for each pixel.

In S30 the processor 210 executes a color conversion process on the target data (the RGB bitmap data in this case) to generate image data corresponding to the types of colorant used for printing. In the present embodiment, the processor 210 generates CMYK bitmap data. The processor 210 performs the color conversion process (an interpolation process, for example) using a lookup table (not illustrated) that specifies correspondences between RGB gradation values and CMYK gradation values. The CMYK gradation values for each pixel represent the quantities of colorants required to print the color of the corresponding pixel. That is, the consumption of colorant is lager as the gradation value becomes larger.

In S33 the processor 210 executes a characteristic information setting process. Characteristic information represents correspondences between input values and output values in a specific color space. The specific color space is the color space represented by a plurality of color components corresponding to the plurality of types of colorant that the print execution unit 290 uses in printing. In the present embodiment, the characteristic information is a polynomial expression representing correspondences between input values and output values in the CMYK color space. The CMYK gradation values (i.e., color specification values in the CMYK color space) are converted on the basis of this characteristic information, thereby generating CMYK gradation values adjusted for reducing the consumption of colorant. In S36 the processor 210 adjusts the CMYK gradation values on the basis of the characteristic information set in S33. The characteristic information will be described later in greater detail.

In S40 the processor 210 executes a halftone process on the CMYK bitmap data to generate dot data indicating the dot formation state for each pixel and each ink color. In the present embodiment, the halftone process is implemented using an error diffusion process that incorporates error matrices. However, a halftone process employing dither matrices may be used instead.

In S50 the processor 210 generates print data from the dot data generated in S40. Print data is expressed in a prescribed data format for controlling the print execution unit 290. For example, the processor 210 generates print data by arranging the dot data in the sequence used for printing and adding various printer control codes and data identification codes.

In S60 the processor 210 supplies the print data generated in S50 to the print execution unit 290. In S70 the print execution unit 290 prints an image based on the print data received in S60, thereby completing the printing process of FIG. 2.

Figure 3:
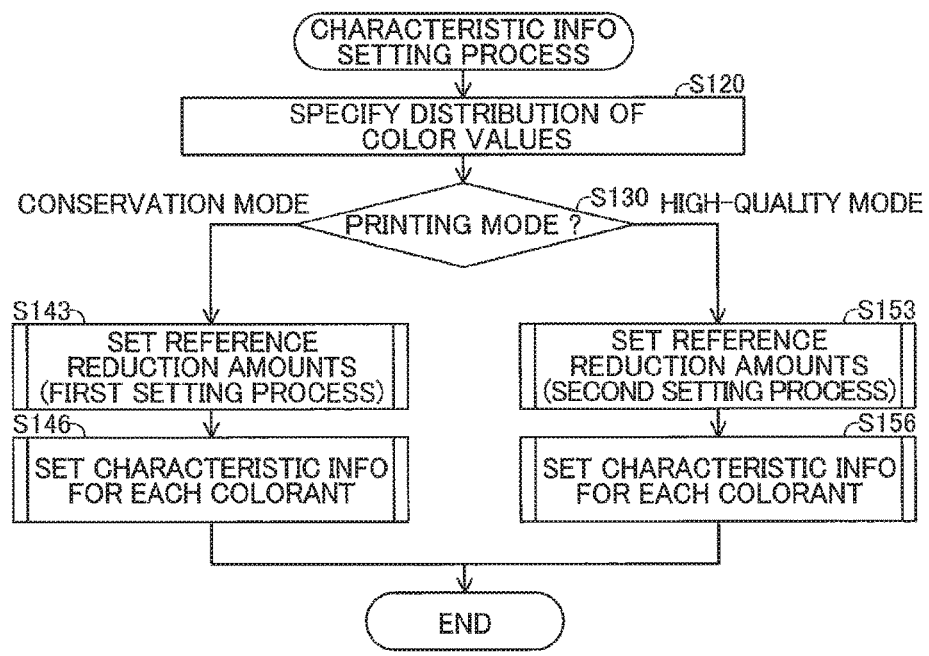
FIG. 3 is a flowchart illustrating an example of a characteristic information setting process.

FIG. 3 is a flowchart illustrating an example of the characteristic information setting process of S33. In S120 of FIG. 3, the processor 210 analyzes the target data to specify the distribution of color values for a specific color component. In the present embodiment, the processor 210 calculates a luminance value Yv from the RGB gradation values for each pixel in the target image and specifies the distribution of luminance values Yv. The luminance value Yv may be a value calculated using a well-known relational expression correlating gradation values in the RGB color space with gradation values in the YCbCr color space (particularly, a relational expression correlating the RGB gradation values with the luminance value of the YCbCr gradation values), for example.

Figure 4:
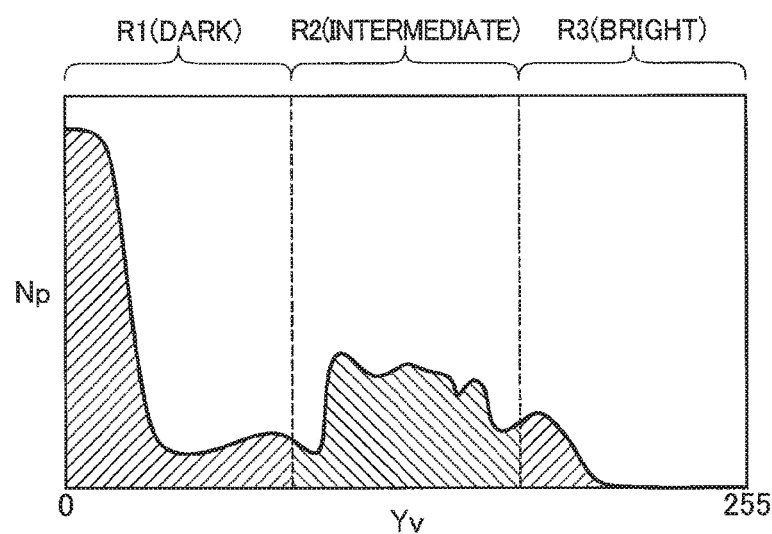
FIG. 4 is a graph illustrating a sample distribution of luminance values Yv.

The graph in FIG. 4 illustrates a sample distribution of luminance values Yv, where the horizontal axis represents the luminance value Yv and the vertical axis represents a pixel number Np. In the example of FIG. 4, luminance values Yv can be varied within a range from 0 to 255. The entire range of luminance values Yv (i.e., the range from 0 to 255 in this case) in FIG. 4 is formed of three partial ranges, namely, a first luminance partial range R1, a second luminance partial range R2, and a third luminance partial range R3. The three luminance partial ranges R1, R2, and R3 are obtained by dividing the entire range of luminance values Yv into three sections. The first luminance partial range R1 is a dark range that includes 0. The third luminance partial range R3 is a bright range that includes 255. The second luminance partial range R2 is an intermediate range between the first luminance partial range R1 and the third luminance partial range R3. In the example of FIG. 4, the three luminance partial ranges R1, R2, and R3 have substantially the same width, but the width of one or more luminance partial ranges may differ from the width of the other luminance partial ranges.

The processor 210 calculates the total number of pixels in each of the three luminance partial ranges R1, R2, and R3 by analyzing the target data. Through this analysis, the processor 210 specifies the distribution of luminance values Yv. In the present embodiment, the distribution of luminance values Yv is expressed as the total number of pixels in each of the partial ranges R1, R2, and R3.

In S130 of FIG. 3, the processor 210 specifies the printing mode designated by the user. The processor 210 advances to S143 when the printing mode is the conservation mode, and advances to S153 when the printing mode is the high-quality mode. Below a description is given first for cases in which the printing mode is the conservation mode, followed by a description for cases in which the printing mode is the high-quality mode.

Figure 5:
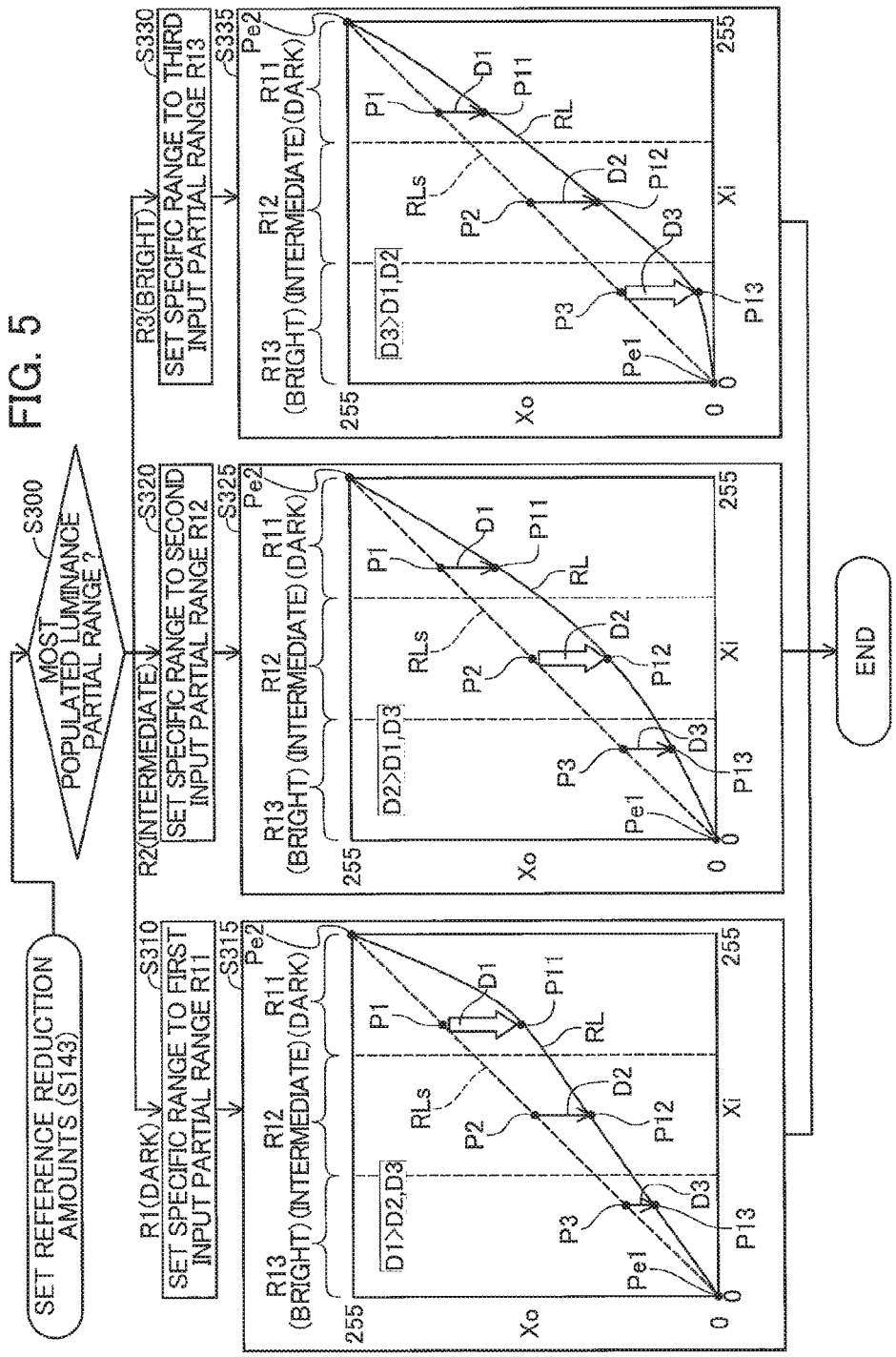
FIG. 5 is a flowchart illustrating an example of a process for setting the reference reduction amounts.

When the printing mode is the conservation mode, in S143 the processor 210 sets reference reduction amounts. FIG. 5 is a flowchart illustrating an example of a process for setting the reference reduction amounts. In S300 of FIG. 5, the processor 210 specifies the luminance partial range having the largest total number of pixels among the three luminance partial ranges R1, R2, and R3 (see FIG. 4; hereinafter called the "most populated luminance partial range"). The processor 210 sets the reference reduction amounts on the basis of this most populated luminance partial range.

The boxes denoted by reference numerals S315, S325, and S335 in FIG. 5 include graphs illustrating examples of reference reduction amounts, and characteristic information represented using the reference reduction amounts, wherein the horizontal axis represents a CMYK input value Xi and the vertical axis represents a CMYK output value Xo. In the example of FIG. 5, the input value Xi and the output value Xo can each be varied within a range from 0 to 255. The characteristic information represents correspondences between input values Xi and output values Xo. The line representing correspondences between input values Xi and output values Xo will be called a "tone curve." The characteristic information is expressed by a polynomial of degree N, for example (where N is an even number of 4 or greater, for example; N=4 in the present embodiment). Correspondences RLs represented by the dashed line in the graphs denote correspondences in which gradation values are not changed, i.e., correspondences in which Xo=Xi over the entire range of input values Xi (hereinafter referred to as the "non-conversion line RLs" or the "non-conversion characteristic information RLs").

Five design points Pe1, P1, P2, P3, and Pe2 used for setting characteristic information are illustrated on the non-conversion line RLs. Design point Pe1 specifying Xi=Xo=0 and design point Pe2 specifying Xi=Xo=maximum gradation value (255 in this case) are fixed points. The processor 210 adjusts the output value Xo of each of the three design points P1, P2, and P3 positioned between these design points Pe1 and Pe2 on the basis of the most populated luminance partial range. In the present embodiment, the output value Xo of each of design points P1, P2, and P3 is modified to a smaller value than the original output value Xo (i.e., the input value Xi).

The entire range of input values Xi in each graph (the range from 0 to 255 in this example) is formed of three partial ranges R11, R12, and R13, namely, a first input partial range R11, a second input partial range R12, and a third input partial range R13. The three partial ranges R11, R12, and R13 are obtained by dividing the entire range of input values Xi into three sections. The first input partial range R11 is a dark range that includes 255. The third input partial range R13 is a bright range that includes 0. The second input partial range R12 is an intermediate range between the first input partial range R11 and the third input partial range R13. In the example of FIG. 5, the first, second, and third input partial ranges R11, R12, and R13 have substantially the same width, but one or more input partial ranges may have a different width than the other input partial ranges.

As illustrated in the graphs, the input value Xi of the first design point P1 falls in the first input partial range R11; the input value Xi of the second design point P2 falls in the second input partial range R12; and the input value Xi of the third design point P3 falls in the third input partial range R13. As illustrated in the graph of S315, an output value Xo in the first input partial range R11 is reduced by reducing the output value Xo of the first design point P1. Here, "reducing the output value Xo" means decreasing the CMYK gradation value, i.e., reducing the quantity of the corresponding colorant. In this way, it is possible to reduce the consumption of colorant required for printing the colors represented by the gradation values in the first input partial range R11 by reducing the output value Xo of the first design point P1. Similarly, as illustrated in the graph of S325, it is possible to reduce the consumption of colorant used for printing colors expressed by gradation values in the second input partial range R12 by reducing the output value Xo of the second design point P2. As illustrated in the graph of S335, it is possible to reduce the consumption of colorant used for printing colors expressed by gradation values in the third input partial range R13 by reducing the output value Xo of the third design point P3.

In the present embodiment, the processor 210 uses the most populated luminance partial range (S300 of FIG. 5) to select a specific range from among the three input partial ranges R11, R12, and R13. In other words, the processor 210 select a specific range from among the three input partial ranges R11, R12, and R13 on the basis of the most populated luminance partial range (S300 of FIG. 5). The processor 210 sets reference reduction amounts D1, D2, and D3 for the output values Xo of the corresponding design points P1, P2, and P3 so that the reduction in consumption of colorant in the specific range is greater than reduction in the other input partial ranges. Specifically, the specific range is set to the input partial range having a brightness corresponding to the brightness of the most populated luminance partial range. When the most populated luminance partial range is the dark first luminance partial range R1, the processor 210 sets the specific range to the dark first input partial range R11 in S310. When the most populated luminance partial range is the intermediate second luminance partial range R2, the processor 210 sets the specific range to the intermediate second input partial range R12 in S320. When the most populated luminance partial range is the bright third luminance partial range R3, the processor 210 sets the specific range to the bright third input partial range R13 in S330.

When the specific range is the dark first input partial range R11, in S315 the processor 210 sets the reference reduction amounts D1, D2, and D3 for the corresponding design points P1, P2, and P3 to prescribed values that satisfy the expression D1>D2>D3. Subsequently, the process of FIG. 5 (i.e., S143 of FIG. 3) ends. The reference reduction amounts D1, D2, and D3 may be set according to the following equations based on the input values Xi of the corresponding design points P1, P2, and P3, for example.

$$D1=0.1 \times Xi$$

$$D2=0.1 \times 0.6 \times Xi$$

$$D3=0.1 \times 0.2 \times Xi$$

When the specific range is the intermediate second input partial range R12, in S325 the processor 210 sets the reference reduction amounts D1, D2, and D3 for the corresponding design points P1, P2, and P3 to prescribed values that satisfy the expression D2>D1, D3. Note that the magnitude relationship between the two reference reduction amounts D1 and D3 may satisfy any of the expressions D1<D3, D1=D3, and D1>D3. Subsequently, the process of FIG. 5 (i.e., S143 of FIG. 3) ends. The reference reduction amounts D1, D2, and D3 may be set according to the following equations based on the input values Xi of the corresponding design points P1, P2, and P3, for example.

$$D1=0.1 \times 0.3 \times Xi$$

$$D2=0.1 \times Xi$$

$$D3=0.1 \times 0.3 \times Xi$$

When the specific range is the bright third input partial range R13, in S335 the processor 210 sets the reference reduction amounts D1, D2, and D3 for the corresponding design points P1, P2, and P3 to prescribed values that satisfy the expression D3>D2>D1. Subsequently, the process of FIG. 5 (i.e., S143 of FIG. 3) ends. The reference reduction amounts D1, D2, and D3 may be set according to the following equations based on the input values Xi of the corresponding design points P1, P2, and P3, for example.

$D1 = 0.1 \times 0.2 \times Xi$ $D2 = 0.1 \times 0.6 \times Xi$ $D3 = 0.1 \times Xi$ The graphs of S315, S325, and S335 indicate design points P11, P12, and P13 (hereinafter called the reference design points P11, P12, and P13) that have been adjusted according to the corresponding reference reduction amounts D1, D2, and D3. Characteristic information RL (i.e., a tone curve RL) in each of the graphs denotes correspondences determined on the basis of the two fixed design points Pe1 and Pe2 and the three reference design points P11, P12, and P13. As will be described later, the processor 210 sets characteristic information (i.e., a tone curve) represented by a polynomial of degree N, the characteristic information being obtained by performing a curve fitting based on the five design points (Pe1, Pe2, P11, P12, and P13) using a polynomial of degree N. For example, when performing the curve fitting using a polynomial of degree 4 for obtaining the characteristic information, the output value Xo is expressed by the equation "$Xo = aXi^4 + bXi^3 + cXi^2 + dXi + e$" using the five variables a, b, c, d, and e. The variables a, b, c, d, and e can be calculated from five equations obtained by substituting the input value Xi and the output value Xo for the five design points into the above equation, thereby obtaining the polynomial of degree 4 representing the characteristic information. The tone curve RL denoted by a solid line in each graph indicates the characteristic information determined by the two fixed design points Pe1 and Pe2 and the three reference design points P11, P12, and P13. In the present embodiment, a polynomial of degree N representing the tone curve RL is obtained using an analytical method as described above on the basis of the plurality of design points. However, the method for obtaining the polynomial of degree N representing the tone curve RL is not limited to the above-described method. For example, for obtaining a polynomial of degree N representing the tone curve RL, a curve fitting based on the plurality of design points may be performed using the method of least squares.

Figure 6:
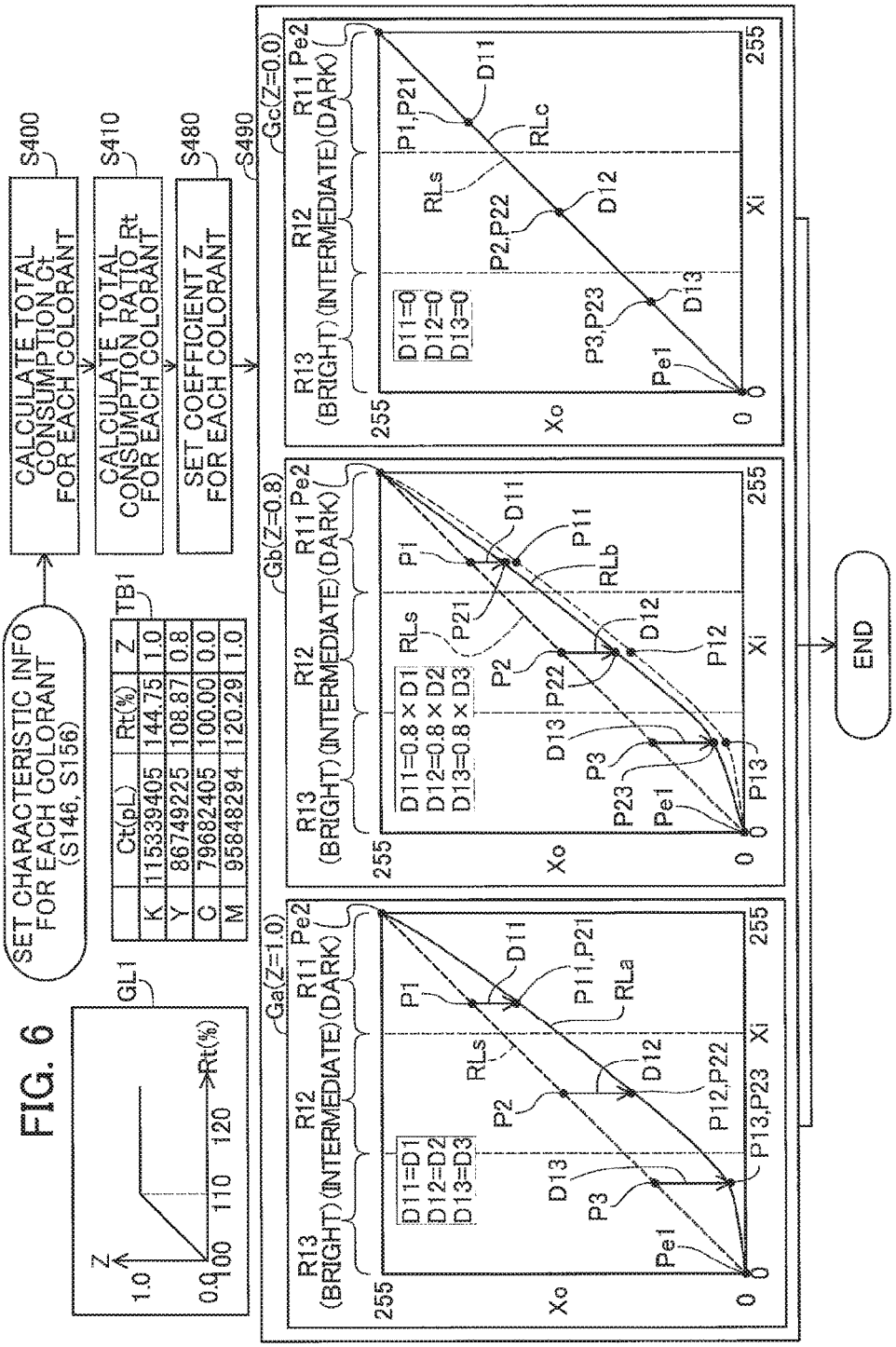
FIG. 6 is a flowchart illustrating an example of a process for setting the characteristic information.

In S146 of FIG. 3, the processor 210 sets characteristic information for each color component corresponding to each type of colorant in the multifunction peripheral 200 (CMYK in this case). FIG. 6 is a flowchart illustrating a sample process for setting the characteristic information for each colorant. In S400 of FIG. 6, the processor 210 calculates a total consumption Ct for each colorant. The total consumption Ct denotes a total consumption amount of each colorant required for printing the target image in the case where all of the CMYK gradation values are not modified in S36, i.e., when assuming that each of output values Xo is the same as the corresponding input value Xi. In the present embodiment, the processor 210 generates print data according to the procedure in FIG. 2 (excluding S33 and S36), calculates the total number of dots for each of the CMYK colors by analyzing the print data, and calculates the total consumption Ct for each colorant by multiplying a colorant amount for one dot by the total number of dots for that colorant. When dots of different sizes are used in printing, the colorant amount for one dot is multiplied by the total number of dots for each size, and the results of these multiplications for each size are added together to calculate the total consumption Ct. A table TB1 in FIG. 6 illustrates an example of the total consumption Ct for each of the CMYK colors (units: pL).

In S410 the processor 210 calculates a ratio Rt of the total consumption for each colorant. The ratio Rt is a percentage based on the smallest total consumption Ct among the total consumptions Ct for the plurality of colorants. Since the total consumption Ct for cyan is the smallest in the example of table TB1, the ratio Rt for each colorant indicates the percentage of the total consumption Ct compared to the total consumption Ct of cyan (units: %).

In S480 the processor 210 sets a coefficient Z for each colorant on the basis of the corresponding ratio Rt. As will be described later, the processor 210 adjusts the design points P1, P2, and P3 using reduction amounts D11, D12, and D13 obtained by multiplying the reference reduction amounts D1, D2, and D3 described in FIG. 5 by the corresponding coefficient Z. Accordingly, a larger coefficient Z results in a greater reduction amount in the output values Xo of the design points P1, P2, and P3, i.e., a greater reduction in the consumption of colorant.

The graph GL1 in FIG. 6 illustrates predetermined correspondences between ratios Rt and coefficients Z, wherein the horizontal axis represents the ratio Rt and the vertical axis represents the coefficient Z. In the present embodiment, the coefficient Z increases from 0 to 1.0 in proportion to the ratio Rt within the range of ratios Rt from 100% to 110%. When the ratio Rt exceeds 110%, the coefficient Z remains fixed at 1.0. In this way, a larger ratio Rt of the total consumption Ct results in a larger coefficient Z, i.e., a greater reduction in the consumption of colorant, thereby reducing the difference in total consumptions Ct among the plurality of colorants.

The processor 210 sets the coefficient Z for each colorant on the basis of the correspondences indicated in the graph GL1. Table TB1 illustrates an example of coefficients Z set according to the graph GL1. In the example of table TB1, the coefficient Z for cyan, having the smallest total consumption Ct, is 0. The coefficient Z for yellow, having a ratio Rt greater than 100% but smaller than 110%, is a value between 0 and 1.0 (specifically, 0.8). The coefficient Z for black and magenta, each having a ratio Rt greater than or equal to 110%, is 1.0.

In S490 the processor 210 sets the characteristic information for each colorant on the basis of the corresponding coefficient Z. The box for S490 includes three graphs Ga, Gb, and Gc illustrating examples of characteristic information. Each of the graphs Ga, Gb, and Gc illustrates example in which the most populated luminance partial range is the bright third luminance partial range R3 (i.e., when the specific range is set to the third luminance partial range R3 in the process of FIG. 5). The first graph Ga illustrates a case in which the coefficient Z is 1.0. The second graph Gb illustrates a case in which the coefficient Z is 0.8. The third graph Gc illustrates a case in which the coefficient Z is 0.

In each of the graphs Ga, Gb, and Gc, the processor 210 sets the reduction amounts D11, D12, and D13 to values obtained by multiplying the reference reduction amounts D1, D2, and D3 by the corresponding coefficient Z. Next, the processor 210 sets design points P21, P22, and P23 (hereinafter called the adjusted design points P21, P22, and P23) by shifting the design points P1, P2, and P3 according to the reduction amounts D11, D12, and D13.

Since the coefficient Z is 1.0 in the first graph Ga, the reduction amounts D11, D12, and D13 are equivalent to the reference reduction amounts D1, D2, and D3, respectively.

Consequently, the adjusted design points P21, P22, and P23 are equivalent to the reference design points P11, P12, and P13, respectively.

Since the coefficient Z is 0.8 in the second graph Gb, the reduction amounts D11, D12, and D13 are all greater than 0 and smaller than the corresponding reference reduction amounts D1, D2, and D3, respectively. Accordingly, the adjusted design points P21, P22, and P23 are positioned between the corresponding design points P1, P2, and P3 on the non-conversion line RLs and the corresponding reference design points P11, P12, and P13, respectively.

Since the coefficient Z is 0 in the third graph Gc, the reduction amounts D11, D12, and D13 are all 0. Consequently, the adjusted design points P21, P22, and P23 are equivalent to the design points P1, P2, and P3 on the non-conversion line RLs, respectively.

In each case, the processor 210 sets characteristic information by performing a curve fitting based on the five design points Pe1, P21, P22, P23, and Pe2 using a polynomial of degree N. A first tone curve RLa (first characteristic information RLa) in the first graph Ga, a second tone curve RLb (second characteristic information RLb) in the second graph Gb, and a third tone curve RLc (third characteristic information RLc) in the third graph Gc each indicate characteristic information determined according to this curve fitting. The characteristic information is set for each of the CMYK color components. Subsequently, the process of FIG. 6 ends. While the present embodiment imposes a condition on the curve fitting that the tone curve represented by a polynomial passes through the two fixed design points Pe1 and Pe2, this condition may be eliminated.

As described above, characteristic information for each of the CMYK color components is set according to the process in S143 of FIG. 3 (the process in FIG. 5) and the process in S146 of FIG. 3 (the process in FIG. 6). In S36 of FIG. 2, the processor 210 adjusts each of the CMYK gradation values on the basis of the characteristic information set in the process of FIG. 3.

Figure 7:
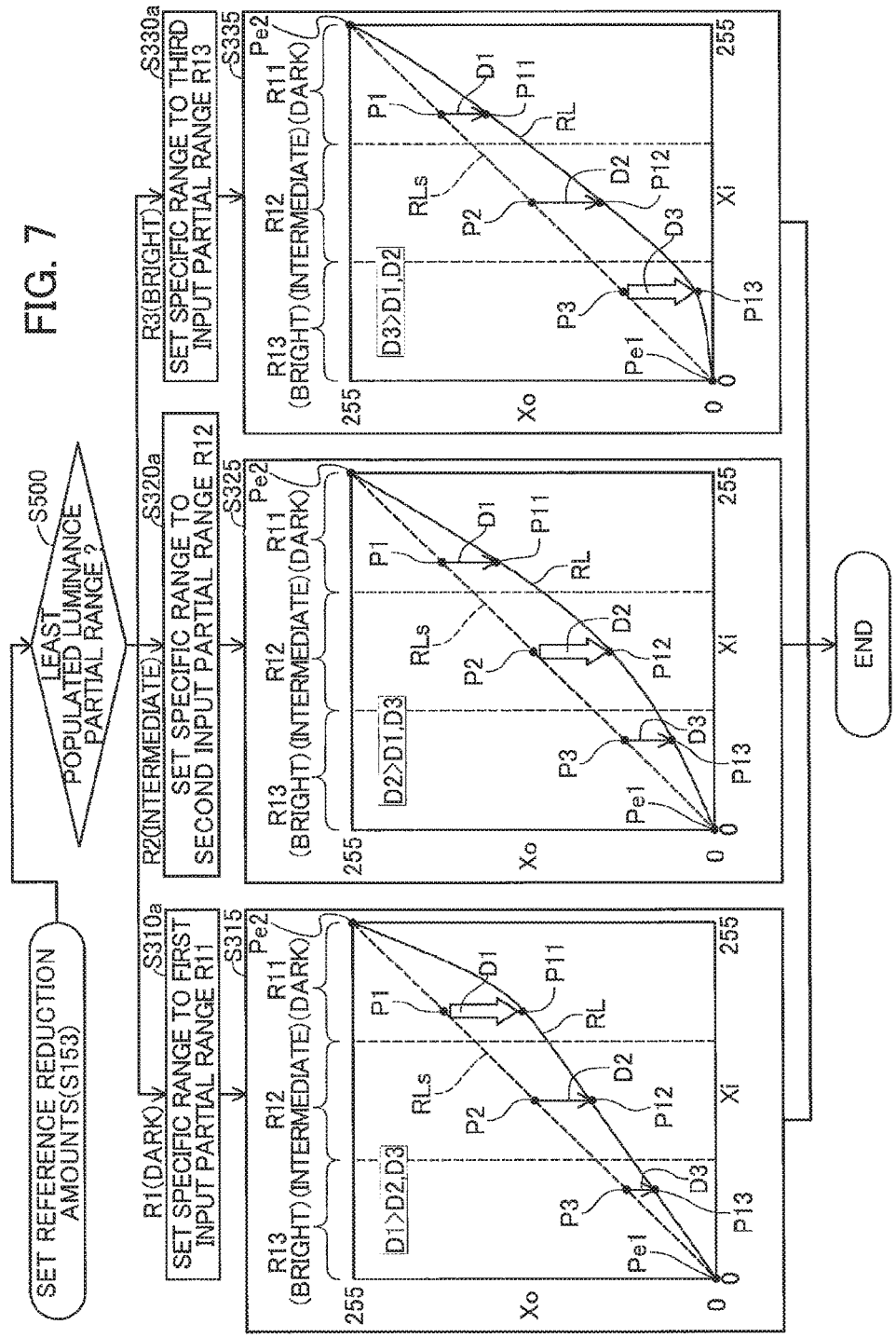
FIG. 7 is a flowchart illustrating an example of a process for setting the reference reduction amounts.

Next, cases in which the printing mode is the high-quality mode will be described. In this case, the processor 210 sets the reference reduction amounts in S153 or FIG. 3. FIG. 7 is a flowchart illustrating an example of the process in S153 for setting the reference reduction amounts. The process in FIG. 7 differs from the process in FIG. 5 in that the least populated luminance partial range rather than the most populated luminance partial range is used for selecting the specific range from among the three input partial ranges R11, R12, and R13 (S500, S310a, S320a, and S330a). Processes S315, S325, and S335 for setting the reference reduction amounts D1, D2, and D3 based on the specific range are identical to the corresponding processes in FIG. 5.

In S500 the processor 210 specifies the least populated luminance partial range, i.e., the luminance partial range having the least total number of pixels, from among the three luminance partial ranges R1, R2, and R3 (see FIG. 4). Next, the processor 210 sets the specific range to the input partial range having a brightness corresponding to the brightness of the least populated luminance partial range from among the three input partial ranges R11, R12, and R13 of the CMYK gradation values. For example, when the least populated luminance partial range is the dark first luminance partial range R1, the processor 210 sets the specific range to the dark first input partial range R11 in S310a. When the least populated luminance partial range is the intermediate second luminance partial range R2, the processor 210 sets the specific range to the intermediate second input partial range R12 in S320a. When the least populated luminance partial range is the bright third luminance partial range R3, the processor 210 sets the specific range to the bright third input partial range R13 in S330a. As in the process of FIG. 5, the processor 210 sets the reference reduction amounts D1, D2, and D3 (S315, S325, or S335) on the basis of the specific range set above.

In this way, the processor 210 sets the reference reduction amounts D1, D2, and D3 in the process of FIG. 7 so that the reduction amount of the consumption of colorant in the CMYK partial range corresponding to the least populated luminance partial range is greater than the reduction amounts in the other partial ranges.

After setting the reference reduction amounts D1, D2, and D3 to complete S153 of FIG. 3, in S156 the processor 210 sets characteristic information for each of the CMYK colorants. S156 is identical to S146 and is performed according to the same procedure in FIG. 6. In this way, the processor 210 sets characteristic information for each of the CMYK color components through the process in S153 of FIG. 3 (the process of FIG. 7) and the process of S156 in FIG. 3 (the process of FIG. 6).

In the present embodiment described above, the processor 210 sets a specific range in the CMYK color space on the basis of the distribution of luminance values Yv (specifically, the input partial range corresponding to the most populated luminance partial range in FIG. 5, and the input partial range corresponding to the least populated luminance partial range in FIG. 7). Next, the processor 210 sets characteristic information for each of the CMYK color components using the specific ranges (S146 and S156 in FIG. 3; FIG. 6).

For colorants having a large ratio Rt of the total consumption Ct (K and M in FIG. 6, for example), the processor 210 sets output values Xo for these colorants (S36 of FIG. 2) using characteristic information (the first characteristic information RLa in the first graph Ga of FIG. 6, for example) set on the basis of the large ratio Rt (specifically, a large coefficient Z). For colorants having a small ratio Rt of the total consumption Ct (Y in FIG. 6, for example), the processor 210 sets the output values Xo for these colorants (S36 of FIG. 2) using characteristic information (the second characteristic information RLb in the second graph Gb of FIG. 6, for example) set on the basis of the small ratio Rt (specifically, a small coefficient Z).

Here, the first characteristic information RLa indicates that consumption amounts of colorant in the specific range (the third input partial range R13 in the example of FIG. 6) are modified (specifically, reduced) by a first colorant amount determined according to the reduction amount D13 (=D3) from the consumption amount when Xo=Xi. The second characteristic information RLb indicates that consumption amounts of colorant within the specific range (the third input partial range R13 in the example of FIG. 6) are modified by a second colorant amount smaller than the first colorant amount from the consumption amount when Xo=Xi. In the preferred embodiment, the second colorant amount is determined according to the reduction amount D13 (=0.8×D3), which is smaller than the reduction amount D13 (=D3) for the first characteristic information RLa. In this way, since the reduction amount for the consumption of colorant within the specific range is set higher when the total consumption Ct is larger, the difference in consumption amounts among different colorants can be reduced. Further, the total consumptions Ct are specified by analyzing the target image data. Accordingly, on the basis of the characteristic information, the processor 210 can adjust gradation values suitably for the target image.

As described above, characteristic information used for generating print data is set using a specific range determined on the basis of the distribution of color values (luminance values Yv in this example). For example, the specific range is the input partial range corresponding to the most populated luminance partial range in FIG. 5 or the input partial range corresponding to the least populated luminance partial range in FIG. 7. Accordingly, the multifunction peripheral 200 can generate print data representing an image in colors suitable for the target image. Further, output values for each colorant can be set using characteristic information having different reduction amounts for the consumption of colorant in the specific range. In the example of FIG. 6, the processor 210 sets characteristic information so that the consumption of colorant in the specific range is reduced more when the total consumption Ct is larger. In this way, the multifunction peripheral 200 can adjust the consumption of colorants on the basis of differences in the total consumptions Ct of the plurality of colorants.

Further, characteristic information used for setting output values Xo for colorants is set on the basis of the total consumptions Ct (FIG. 6). This method prevents colors in the same target image from varying each time the image is printed, since the same total consumptions Ct are calculated from the same target image. Note that the total consumption Ct is an example of an index value and also is an example of a consumption index value.

As described in S120 of FIG. 3, the processor 210 specifies the number of pixels in each of the three luminance partial ranges R1, R2, and R3 as the distribution of color values (the luminance values Yv in this case). Subsequently, as described in FIGS. 5, 6, and 7, the reduction amounts D11, D12, and D13 of the output values Xo are set differently in each of the input partial ranges R11, R12, and R13 (particularly for the first characteristic information RLa and second characteristic information RLb). Hence, the ratio of output values Xo to input values Xi represented by the first characteristic information RLa differs among the plurality of input partial ranges R11, R12, and R13 for the CMYK gradation values corresponding to the plurality of luminance partial ranges R1, R2, and R3 representing color value distribution. Since the ratio of output values Xo to input values Xi differs among the input partial ranges R11, R12, and R13 for the CMYK gradation values corresponding to the luminance partial ranges R1, R2, and R3 representing the color value distribution, the processor 210 can suitably set characteristic information indicating different characteristics for each of the input partial ranges R11, R12, and R13 on the basis of distribution of color values.

As described in FIG. 5, the processor 210 sets the specific range to the input partial range corresponding to the most populated luminance partial range when the printing mode is the conservation mode (S300, S310, S320, and S330). As described in FIGS. 5 and 6, the processor 210 sets the characteristic information such that the consumption of colorant in the specific range is reduced more than in the other input partial ranges. For example, as to the first characteristic information RLa in the first graph Ga of FIG. 6, the reduction amount (the reduction amount D13) in the third input partial range R13 that is the specific range is greater than the reduction amounts (the reduction amounts D11 and D12) in the other input partial ranges R11 and R12. Since the reduction amount is highest in the input partial range corresponding to the most populated luminance partial range, the processor 210 can effectively reduce the consumption of colorant. Further, the reduction amount is less in the other input partial ranges, i.e., in input partial ranges corresponding to luminance partial ranges having fewer pixels. Therefore, the processor 210 can prevent excessive changes in the printed colors for pixels in the luminance partial ranges having fewer pixels.

As described in FIG. 7, the processor 210 sets the specific range to the input partial range corresponding to the least populated luminance partial range when the printing mode is the high-quality mode (S500, S310a, S320a, and S330a). As described in FIGS. 6 and 7, the processor 210 then sets characteristic information such that the consumption of colorant in the specific range is reduced more than in the other input partial ranges. Since the reduction amount is highest in the input partial range corresponding to the least populated luminance partial range in this way, the processor 210 can reduce the consumption of colorant while minimizing areas in which colors are changed as a result of adjusting gradation values on the basis of the characteristic information (i.e., as a result of reducing the consumption of colorant) in the target image to be printed. Further, the consumption amount is small in the other input partial ranges, i.e., input partial ranges corresponding to luminance partial ranges having more pixels. Therefore, the processor 210 can suppress excessive changes in printed colors in a broad range of the target image.

As described in FIG. 6, the processor 210 calculates the ratios Rt of total consumptions Ct for colorants relative to the total consumption Ct of a specific colorant (the colorant having the smallest total consumption Ct in this example). The processor 210 then sets characteristic information such that reduction in the consumption of colorant as a result of converting input values Xi to output values Xo based on the characteristic information is higher for colorants whose total consumption Ct represented by the ratio Rt is higher. Accordingly, the processor 210 can reduce the actual difference in total consumption among the plurality of colorants.

As described in FIG. 3, the processor 210 executes one of a first setting process (S143) for setting the specific range to a range corresponding to the most populated luminance partial range, and a second setting process (S153) for setting the specific range to a range corresponding to the least populated luminance partial range on the basis of the printing mode. As described in S05 of FIG. 2, the user selects the printing mode. Hence, the one selected by the user from among the first setting process and the second setting process is executed by the processor 210, thereby enabling the multifunction peripheral 200 to set characteristic information suited to the user's preferences.

B. Second Embodiment

Figure 8:
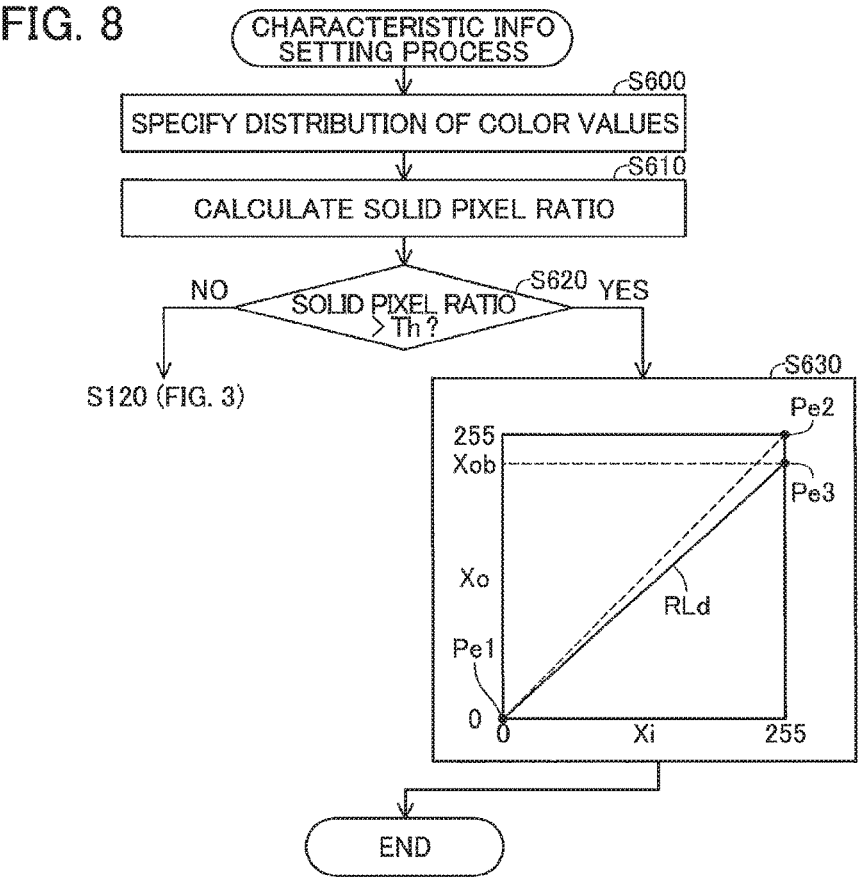
FIG. 8 is part of a flowchart for the characteristic information setting process according to a second embodiment.

FIG. 8 illustrates part of a flowchart for the characteristic information setting process (S33 of FIG. 2) according to a second embodiment. In S600 of FIG. 8, the processor 210 specifies the distribution of gradation values on the basis of the CMYK gradation values generated in S30 of FIG. 2. In the second embodiment, the processor 210 calculates the total number of first pixels and total number of second pixels described below. First pixels are solid pixels in which the gradation value for at least one of the CMYK components is the maximum gradation value (255 in this case) among the entire range of gradation values (from 0 to 255). Second pixels are pixels in which the gradation values for all CMYK components are less than the maximum gradation value. The maximum gradation value in this case indicates the maximum quantity of colorant.

In S610 the processor 210 calculates the solid pixel ratio indicating the ratio of solid pixels to the total number of pixels in the target image data. In S620 the processor 210 determines whether the solid pixel ratio is greater than a predetermined reference ratio Th. When the solid pixel ratio is greater than the reference ratio Th (S620: YES), in S630 the processor 210 sets characteristic information.

The box identified as S630 in FIG. 8 includes a graph illustrating an example of characteristic information, where the horizontal axis represents the input value Xi and the vertical axis represents the output value Xo. RLd denotes the characteristic information in the graph. This characteristic information RLd is a straight line connecting two design points Pe1 and Pe3. Design point Pe1 indicates Xi=Xo=0. Design point Pe3 is obtained by modifying the output value Xo for design point Pe2 (Xi=Xo=maximum gradation value (255 in this case)) to a value Xob less than the maximum gradation value. The design point Pe3 (i.e., the value Xob) is predetermined in the present embodiment. The output value Xo of the design point Pe3 is set based on the input value Xi of the design point Pe3, for example. For example, the output value Xo may be set according to the equation Xo=0.9×Xi (Xo=0.9×255=230, in the present embodiment). In S630 the processor 210 sets the characteristic information to this characteristic information RLd, and subsequently ends the process of FIG. 8. In S36 of FIG. 2, the processor 210 applies the same characteristic information (the characteristic information RLd in this case) to all CMYK color components.

Unlike the characteristic information RLa, RLb, and RLc described in FIG. 6, the output value Xo corresponding to the input value Xi of the maximum gradation value is smaller than the maximum gradation value in the characteristic information RLd. Hence, the maximum gradation value of a solid pixel is adjusted to a value Xob less than the maximum gradation value, thereby reducing the consumption of colorant required for printing a solid pixel. The processor 210 can greatly reduce the consumption of colorant required for printing a target image particularly when the solid pixel ratio is greater than the reference ratio Th, such as when a solid area (for example, a region representing a filled object such as a pie chart) represented by solid pixels in the target image is large. Further, since the segment of the characteristic information RLd between the design points Pe1 and Pe3 is a straight line, this characteristic information can prevent the target image from being printed in unnatural colors. Further, the reduction amount of the output value Xo (i.e., the amount of reduction in consumption of colorant) when the input value Xi is the maximum gradation value is larger than the reduction amount of the output values Xo for the range of other input values Xi. Hence, the consumption of colorant can be effectively reduced by reducing the gradation values of solid pixels from the maximum gradation value to a value Xob that is less than the maximum gradation value. Further, since the reduction amount of the output value Xo (i.e., the amount of reduction in consumption of colorant) in the range of input values Xi not including the maximum gradation value is smaller than that for the input value Xi having the maximum gradation value, this configuration prevents the target image from being printed in unnatural colors.

Further, when the solid pixel ratio is less than or equal to the reference ratio Th (S620: NO), the processor 210 advances to S120 of FIG. 3 and sets characteristic information according to the same process described in the first embodiment. Subsequently, the processor 210 ends the characteristic information setting process. Thus, when the solid pixel ratio is small, the processor 210 can set suitable characteristic information for the target image according to the same method described above in the first embodiment.

C. Third Embodiment

Figure 9:
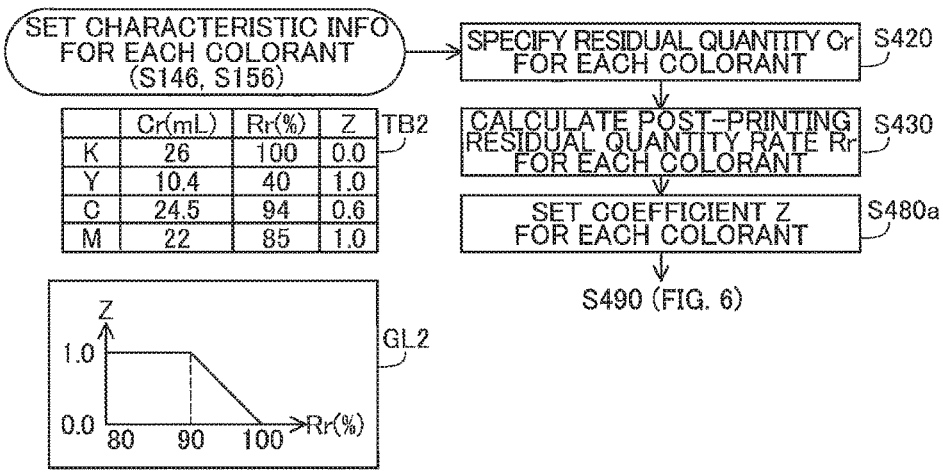
FIG. 9 is part of a flowchart for the characteristic information setting process according to a third embodiment.

FIG. 9 illustrates part of a flowchart of the process for setting characteristic information for each color component (S146 and S156 of FIG. 3; FIG. 6) according to a third embodiment. The third embodiment differs from the first embodiment illustrated in FIG. 6 in that a residual quantity Cr is used in place of the total consumption Ct.

In S420 of FIG. 9, the processor 210 specifies the residual quantity Cr of each colorant prior to printing the target image. In the present embodiment, the print execution unit 290 (see FIG. 1) can output residual quantity data specifying the residual quantity of each colorant at the current point in time. The processor 210 issues a request to the print execution unit 290 for the residual quantity data, acquires the residual quantity data from the print execution unit 290, and uses this residual quantity data to specify the residual quantity Cr of each colorant. A table TB2 in FIG. 9 illustrates sample residual quantities Cr for the CMYK colorants (units: mL). Note that various other methods may also be used for specifying the residual quantities Cr. For example, the processor 210 may calculate a cumulative quantity of total consumption for each color from each printing operation executed after the previous colorant container (ink cartridge, for example) is replaced with a new container, and may store the cumulative quantity for each color in the nonvolatile storage 230. Next, the processor 210 may calculate the residual quantity Cr for each color by subtracting this cumulative quantity from a predetermined amount of colorant accommodated in a new container.

In S430 the processor 210 calculates a ratio Rr of the residual quantity Cr for each colorant. The ratio Rr is the percentage of the residual quantity Cr of the colorant relative to the largest residual quantity Cr among the plurality of colorants. Since the residual quantity Cr of black is largest in the example of table TB2, the ratio Rr for each colorant denotes the percentage of the residual quantity Cr of that colorant relative to the residual quantity Cr of black (units: %).

In S480a, the processor 210 sets the coefficient Z for each colorant on the basis of its ratio Rr. The graph GL2 in FIG. 9 illustrates predetermined correspondences between ratios Rr and coefficients Z. As illustrated in the graph, the coefficient Z decreases from 1.0 to 0 in proportion to the ratio Rr for the range of ratios Rr between 90% and 100%. For ratios Rr less than or equal to 90%, the coefficient Z is constant at 1.0. In this way, the smaller the ratio Rr of the residual quantity Cr, the greater the coefficient Z, i.e., the greater the reduction in colorant consumption. Thus, this configuration can suppress differences in residual quantities from increasing among the plurality of colorants.

After completing S480a, the processor 210 advances to S490 of FIG. 6. As in the first embodiment described with reference to FIG. 6, the processor 210 sets characteristic information based on the coefficient Z. Subsequently, the processor 210 ends the process of S146 or S156 of FIG. 3.

As described above, characteristic information used for setting output values Xo for each colorant is set using the residual quantity Cr of the corresponding colorant. Thus, the processor 210 can prevent differences in residual quantities of colorants from increasing among the plurality of colorants in the print execution unit 290. Here, the residual quantity Cr is an example of an index value, and also is an example of a residual quantity index value.

D. Fourth Embodiment

Figure 10:
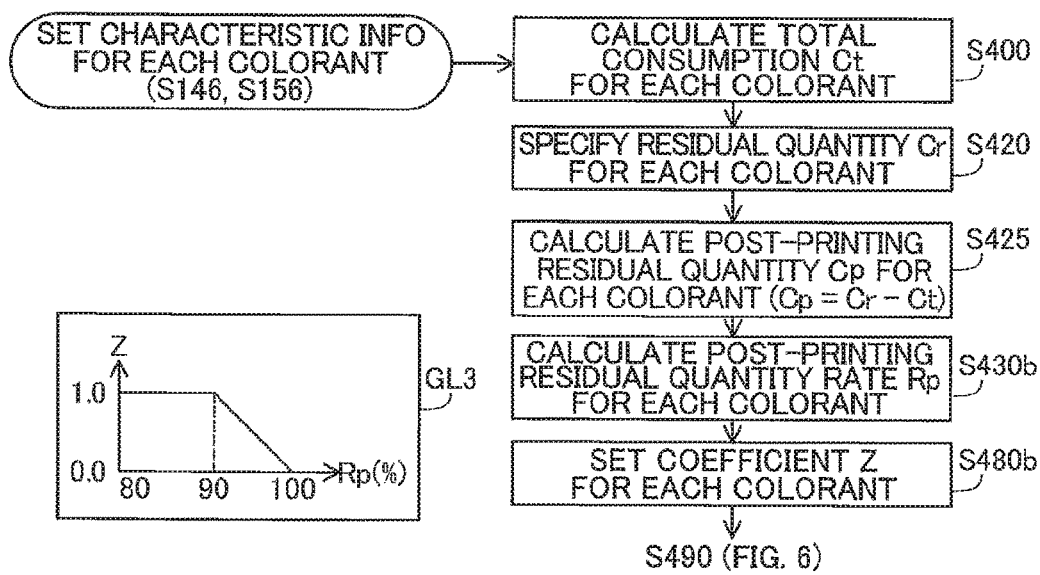
FIG. 10 is part of a flowchart for the characteristic information setting process according to a fourth embodiment.

FIG. 10 illustrates part of a flowchart of the process for setting the characteristic information for each colorant (S146, S156 or FIG. 3) according to a fourth embodiment. In the fourth embodiment, both the total consumption Ct described in FIG. 6 and the residual quantity Cr described in FIG. 9 are used as index values related to the quantity of colorant.

S400 in FIG. 10 is identical to the same step in FIG. 6 and is performed to calculate the residual quantity Cr of each colorant. S420 in FIG. 10 is identical to the same step in FIG. 9 and is performed to specifies the residual quantity Cr for each colorant. In S425 the processor 210 calculates a post-printing residual quantity Cp for each of the colorants. The post-printing residual quantity Cp is obtained by subtracting total consumption Ct from residual quantity Cr (i.e., Cp=Cr−Ct). A table TB3 in FIG. 10 illustrates an example of residual quantities Cr, total consumptions Ct, and post-printing residual quantities Cp for all CMYK color components (units for residual quantity Cr: mL, units for total consumption Ct: pL, units for post-printing residual quantity Cp: mL).

In S430b the processor 210 calculates a ratio Rp of the post-printing residual quantity for each colorant. The ratio Rp is the percentage of the post-printing residual quantity Cp relative to the largest post-printing residual quantity Cp among the plurality of colorants. Since the post-printing residual quantity Cp for black is largest in the example of table TB3, the ratio Rp of each colorant is set to the percentage of the post-printing residual quantity Cp for that colorant relative to the post-printing residual quantity Cp of black (units: %).

In S480b the processor 210 sets the coefficient Z for each colorant on the basis of the corresponding ratio Rp. A graph GL3 in FIG. 10 illustrates predetermined correspondences between ratios Rp and coefficients Z. As illustrated in the graph, the coefficient Z decreases from 1.0 to 0 in proportion to the ratio Rp within the range of ratios Rp between 90% and 100%. For ratios Rp less than or equal to 90%, the coefficient Z is constant at 1.0. In this way, the smaller the ratio Rp of the post-printing residual quantity Cp, the greater the coefficient Z, i.e., the greater the reduction in colorant consumption. Therefore, this configuration can suppress differences in residual quantities from increasing among the plurality of colorants after the target image is printed.

After completing S480b, the processor 210 advances to S490 in FIG. 6. As in the first embodiment described in FIG. 6, the processor 210 sets the characteristic information based on the coefficient Z. Subsequently, the processor 210 ends the process of S146 or S156 in FIG. 3.

As described above, characteristic information used for setting output values Xo for colorants is specified using both the total consumption Ct and residual quantity Cr as examples of index values related to the quantity of colorant. Accordingly, this method can suppress an increase in the differences among residual quantities of colorants within the print execution unit 290 after the target image is printed.

E. Variations of the Embodiments (1) Any of various information specifying correspondences between input values Xi and output values Xo may be used as the characteristic information in place of the polynomial of degree N described in FIG. 6. For example, a lookup table may be used as the characteristic information. In any case, the output values Xo preferably change continuously rather than in steps in response to changes in the input values Xi. Further, the output values Xo preferably increase monotonically in response to increases in the input value Xi. Further, when characteristic information is set using both the total consumption Ct and residual quantity Cr, as in the example of FIG. 10, a plurality of sets of characteristic information is preferably set such that the reduction amounts in the consumption of colorants whose total consumption Ct is relatively high and whose residual quantity Cr is relatively low (for example, yellow in FIG. 10) is greater than the reduction amounts in the consumption of colorants whose total consumption Ct is relatively low and whose residual quantity Cr is relatively high (for example, cyan in FIG. 10). Note that the reduction amount is greater for larger coefficients Z in the present embodiments described above.

In any case, the processor 210 may select characteristic information to be used for adjusting gradation values from among a plurality of sets of characteristic information stored in advance in a storage device, rather than dynamically generating the characteristic information. In general, it is preferable that the processor 210 prepare characteristic information for adjusting gradation values (where "preparing characteristic information" includes the meanings of generating characteristic information and acquiring pre-stored characteristic information from a storage device). Further, the total number of sets of characteristic information that can be set may be limited to a small number, unlike in the first embodiment described with reference to FIG. 6. For example, the characteristic information may be set to one of the sets of reference characteristic information determined based on the reference reduction amounts D1, D2, and D3 illustrated in FIGS. 5 and 7, and the non-conversion characteristic information RLs specifying Xo=Xi. Here, the processor 210 may select the reference characteristic information when the coefficient Z is greater than or equal to a threshold value (0.5, for example) and may select the non-conversion characteristic information RLs when the coefficient Z is less than the threshold value, for example. In either case, the non-conversion characteristic information RLs indicates that the consumption amount of colorant is modified by 0. Further, the non-conversion characteristic information RLs can be used as characteristic information set independently from the specific range based on the color value distribution.

(2) The colorant whose ratio Rt calculated in S410 of FIG. 6 is used as the reference ratio Rt may be a colorant other than the colorant having the smallest total consumption Ct. For example, the ratios Rt may be calculated based on the colorant having the largest total consumption Ct. Alternatively, the ratios Rt may be calculated based on the total consumption Ct of a predetermined colorant (the magenta colorant, for example). In any case, a plurality of sets of characteristic information for controlling the consumption of each colorant (characteristic information for each of the plurality of color components corresponding to the plurality of colorants, for example) is preferably set such that the reduction amount in the consumption of colorant is greater when the total consumption expressed by the ratio Rt is larger.

(3) The colorant whose ratio Rr calculated in S430 of FIG. 9 is used as a reference may be a colorant other than the colorant having the largest residual quantity Cr. For example, the ratios Rr may be calculated on the basis of the colorant having the smallest residual quantity Cr. Alternatively, the ratios Rr may be calculated on the basis of the residual quantity Cr of a predetermined colorant (the cyan colorant, for example). In any case, a plurality of sets of characteristic information for controlling the consumption of each colorant (characteristic information for each of the plurality of color components corresponding to the plurality of colorants, for example) is preferably set such that the reduction amount in the consumption of colorant is larger for smaller residual quantities represented by the ratio Rr.

(4) Various values related to quantity of colorant may be used as the index value related to colorant quantity in place of the total consumption Ct and residual quantity Cr. For example, the sum of gradation values (specifically, the sum of gradation values for each of the plurality of pixels in the target image by color component) for each of the color components corresponding to the colorants used in printing (C, M, Y, and K in this example) may be used rather than the results of the halftone process. In this case, a large sum indicates a large consumption amount of the corresponding colorant. Alternatively, the processor 210 may use a lookup table representing correspondences between RGB gradation values and consumption amounts by colorant to specify the consumption amounts by colorant for each of plurality of pixels in the target image and may use the sum of the specified consumption amounts for each colorant (specifically, the sum of consumption amounts by colorant for each of plurality of pixels in the target image) as the index value. Alternatively, the inverse of the consumption amount of each colorant may be used as the index value. In general, various values having a correlation to the consumption amounts of colorants required for printing a target image may be used as indices. In any case, the index value may be specified using just a portion of the pixels constituting the target image rather than all pixels. In such a case, it is preferable that the portion of pixels be distributed fairly evenly throughout the entire target image. Further, values related to the residual quantities of colorants in the print execution unit 290 may be used as index values rather than values used as the consumption amounts of colorants. The inverse of the residual quantity may also be used as an index value. In general, various values having a correlation to the residual quantity of colorant in the print execution unit 290 may be used.

(5) While the distribution of luminance values Yv is used in the present embodiments as the distribution of color values for pixels representing the target image, the distribution of other color components may be used instead. For example, the multifunction peripheral 200 may use the distribution of green gradation values or the distribution of L* values in the CIELab color space. Further, the total number of the type-1 partial ranges (the first, second, and third luminance partial ranges R1, R2, and R3 in the example of FIG. 4) forming the entire range of color values for which distribution is determined is not limited to three, but may be any number of two or greater. For example, the total number of type-1 partial ranges may be two, four, or five. In any case, it is preferable that the plurality of type-1 partial ranges for color value distribution have a plurality of corresponding type-2 partial ranges (the first, second, third input partial ranges R11, R12, and R13 in FIG. 6, for example) in a color space for input values Xi and output values Xo of the characteristic information (the CMYK color space, for example). Further, a specific range is preferably set from among the plurality of type-2 partial ranges on the basis of the distribution of color values. In all cases, the distribution of color values may be specified using some of the pixels in the target image rather than all of the pixels. In such a case, the portion of pixels is preferably distributed fairly evenly throughout the entire target image.

Here, first characteristic information controlling the consumption amount of a first colorant is preferably configured so that the consumption of colorant is modified by a first colorant amount within the specific range, and second characteristic information controlling the consumption amount of a second colorant correlated with an index value specifying an amount of colorant different from the first colorant is preferably configured so that the consumption of colorant is modified by a second colorant amount different from the first colorant amount within the specific range. This configuration can generate print data suited to the target image while adjusting the consumption amounts of colorants on the basis of different index values among the colorants.

The type-2 partial range (the third input partial range R13 in FIG. 6, for example) corresponding to the type-1 partial range (the third partial range R3 in FIG. 4, for example) is preferably a range that includes at least some of the pixels within the type-1 partial range in the target image.

(6) The solid pixel ratio may be calculated for each color component in the example of FIG. 8. Thereafter, the characteristic information RLd set in S630 may be used for color components whose solid pixel ratio is greater than the reference ratio Th, while characteristic information set in the process of FIG. 3 may be used for color components whose solid pixel ratio is less than or equal to the reference ratio Th. Further, when the gradation values of color components indicate a greater amount of colorant for smaller values, pixels corresponding to the minimum gradation value (i.e., the gradation value indicating the largest amount of colorant) may be treated as solid pixels.

(7) In the process of FIG. 3, one of either steps S143 and S146 in the conservation mode or steps S153 and S156 in the high-quality mode may be eliminated. Further, the processor 210 may select a normal mode that omits the color adjustment process (S36 of FIG. 2) using characteristic information.

(8) The characteristic information may function to increase the quantity of colorant consumed. For example, in the processes of FIGS. 5 and 7, the processor 210 may increase the output values Xo of design points P1, P2, and P3 by the corresponding reference reduction amounts D1, D2, and D3 rather than decreasing the output values Xo by the reference reduction amounts D1, D2, and D3. Here, the characteristic information is preferably set such that the amount of increase in the output value Xo (i.e., the amount of increase in consumption of colorant) is greater for smaller total consumptions Ct. This configuration can reduce differences in total actual consumption of colorant among the plurality of colorants. It is also preferable that characteristic information be set such that the amount of increase in the output value Xo (i.e., the amount of increase in colorant consumption) is greater for larger residual quantities Cr. This configuration can reduce the difference in residual quantity of colorant among the plurality of colorants. Thus, characteristic information may serve to decrease colorant consumption or may serve to increase colorant consumption. In general, characteristic information may represent various correspondences between input values Xi and output values Xo for modifying the consumption of colorants.

(9) In all of the above cases, characteristic information can be described as follows. Assume that characteristic information represents correspondences between input values and output values in a specific color space and that output values are set according to first characteristic information for a first colorant and are set according to second characteristic information for a second colorant. Further assume that the first characteristic information has output values specifying that the consumption amount of colorant changes by a first colorant amount within a specific range, and that the second characteristic information has output values specifying that the consumption amount of colorant changes by a second colorant amount different from the first colorant amount within the specific range. In the example of FIG. 6, the first characteristic information RLa has output values Xo indicating that the consumption of colorant changes by an amount equivalent to the reduction amount D13 (=D3) within the third input partial range R13, and the second characteristic information RLb has output values Xo indicating that the consumption of colorant changes by a smaller amount equivalent to the reduction amount D13 (=0.8×D3) within the third input partial range R13. Here, when the specific range changes according to this distribution, it can be said that the specific range is set on the basis of the distribution of color values. Further, this specific range may be the range with the largest amount of change (amount of increase or decrease, for example) in the consumption of colorant. In the example of FIG. 6, the third input partial range R13 is the range having the largest amount of reduction in consumption among the three partial ranges R11, R12, and R13. When the amount of change in colorant consumption (amount of change in gradation values (i.e., the output values Xo), for example) differs according to the gradation value (i.e., the input value Xi), the maximum amount of change in the consumption of colorant (the maximum amount of change in the gradation values (i.e., the output values Xo), for example) within the input partial ranges should be used for comparison. Note that the specific color space should be a color space expressed by a plurality of color components corresponding to the plurality of colorants.

(10) Various other procedures may be used for the printing process in place of the procedure in FIG. 2. For example, the processor 210 may perform a calibration process for calibrating the CMYK gradation values separate from the color adjustment process using the characteristic information. The calibration process adjusts the gradation values for each color component so that the color densities printed on paper change linearly in response to changes in gradation values for each of the CMYK colors. The processor 210 executes the calibration process using calibration tables prepared for each of the four CMYK color components, for example. The calibration tables are one-dimensional lookup tables correlating pre-calibrated gradation values with post-calibrated gradation values. This calibration process is performed between the color conversion process and the color adjustment process using the characteristic information, for example.

(11) The data format of the target data may be any format, and is not limited to the bitmap format. For example, the data format may be the Portable Document Format (PDF). When the format of the target data differs from the bitmap format, the processor 210 converts (rasterizes, for example) the target data to generate bitmap data, and uses the resulting bitmap data to execute the printing process.

(12) The structure of the multifunction peripheral 200 that executes image processes for printing may differ from the structure described in the first embodiment. For example, the colorants used by the print execution unit 290 may be a plurality of arbitrary types of colorant, and are not limited to the four colors cyan, magenta, yellow, and black. Further, the print execution unit 290 may be omitted from the multifunction peripheral 200. Further, the control device 202 may be configured of a dedicated hardware circuit, such as an application specific integrated circuit (ASIC). Further, the device that generates print data may be any of various devices (for example, a digital camera, scanner, smartphone, or personal computer) different from the multifunction peripheral 200. Further, a plurality of devices that can communicate over a network (computers, for example) may each implement some of the functions for generating print data performed by the image processing apparatus so that the devices as a whole can provide the functions required for generating print data. Here, the system including the devices corresponds to the image processing apparatus.

(12) The image processing apparatus of FIG. 1 may be a device other than a personal computer (a digital camera, scanner, or smartphone, for example). Further, the image processing apparatus may constitute part of the printing device. Further, a plurality of devices that can communicate over a network (computers, for example) may each implement some of the functions of the image processes performed by the image processing apparatus so that the devices as a whole can provide the functions required for implementing the image processes. Here, the system including the devices corresponds to the image processing apparatus.

In the embodiments described above, part of the configuration implemented in hardware may be replaced with software and, conversely, all or part of the configuration implemented in software may be replaced with hardware. For example, a dedicated hardware circuit may be provided to execute the functions in the process of FIG. 3 for setting characteristic information.

When all or some of the functions of the present disclosure are implemented with computer programs, the programs can be stored on a computer-readable storage medium (a non-temporary storage medium, for example). The programs may be used on the same storage medium on which they were supplied, or may be used on a storage medium different from the storage medium on which they were supplied (computer-readable storage medium). The "computer-readable storage medium" may be a portable storage medium, such as a memory card or CD-ROM; an internal storage device built into the computer, such as any of various ROM or the like; or an external storage device, such as a hard disk drive, connected to the computer.

While the description has been made in detail with reference to the above embodiment, it would be apparent to those skilled in the art that various changes and modifications may be made thereto.

What is claimed is:

1. An image processing apparatus comprising a controller configured to perform:
   acquiring target image data representing a target image to be printed by a printer using a plurality of types of colorant, the target image data including a plurality of pixels, the plurality of types of colorant including a first colorant and a second colorant;
   acquiring a plurality of color component values in a specific color space of each of the plurality of pixels from the target image data, the specific color space being represented by a plurality of color components corresponding to respective ones of the plurality of types of colorant, the plurality of color components including a first color component corresponding to the first colorant and a second color component corresponding to the second colorant, the plurality of color component values including a first color component value for the first color component and a second color component value for the second color component;

specifying a distribution of color values of the plurality of pixels in the target image data by analyzing the target image data;

setting a specific range with respect to the plurality of color component values on the basis of the distribution of color values;

specifying a plurality of index values corresponding to respective ones of the plurality of types of colorant, each of the plurality of index values being related to a quantity of corresponding type of colorant, the plurality of index values including a first index value and a second index value, the first index value being related to a quantity of the first colorant, the second index value being related to a quantity of the second colorant;

setting characteristic information including first characteristic information and second characteristic information which correlate input values in the specific color space with output values in the specific color space on a one-to-one basis, the input values including a specific input value within the specific range, the specific input value being correlated with a first specific output value by the first characteristic information, the specific input value being correlated with a second specific output value by the second characteristic information, the first specific output value indicating that a colorant consumption quantity for the specific input value is changed from an original colorant consumption quantity for the specific input value by a first colorant quantity, the original colorant consumption quantity being a colorant consumption quantity when assuming that each of the output values is in coincidence with corresponding input value, the second specific output value indicating that the colorant consumption quantity for the specific input value is changed from the original colorant consumption quantity for the specific input value by a second colorant quantity different from the first colorant quantity, at least one of the first characteristic information and the second characteristic information being set on the basis of the specific range in the setting the characteristic information; and converting the target image data using the characteristic information for generating print data, the print data being supplied to the printer, the converting the target image data including changing the plurality of color component values of each of the plurality of pixels in the target image, the changing the plurality of color component values including:

changing the first color component value of each of the plurality of pixels as the input value to a first output color component value as the output value according to the first characteristic information; and changing, when the second index value indicates that the quantity of the second colorant differs from the quantity of the first colorant, the second color component value of each of the plurality of pixels as the input value to a second output color component value as the output value according to the second characteristic information.

2. The image processing apparatus according to claim 1, wherein the plurality of index values includes a plurality of consumption quantity index values corresponding to respective ones of the plurality of types of colorant, each of the plurality of consumption quantity index values being related to an estimated total consumption quantity of corresponding type of colorant, the estimated total consumption quantity being a total consumption quantity when assuming that the generating the print data is performed without performing the changing the plurality of color component values, the total consumption quantity being a total quantity consumed for printing the target image, the plurality of consumption quantity index values including a first consumption quantity index value and a second consumption quantity index value, the first consumption quantity index value being related to an estimated total consumption quantity of the first colorant, the second consumption quantity index value being related to an estimated total consumption quantity of the second colorant, and wherein the second consumption quantity index value indicates that the estimated total consumption quantity of the second colorant is smaller than that of the first colorant.

3. The image processing apparatus according to claim 1, wherein the plurality of index values includes a plurality of residual quantity index values corresponding to respective ones of the plurality of types of colorant, each of the plurality of residual quantity index values being related to a residual quantity of corresponding type of colorant in the printer, the plurality of residual quantity index values including a first residual quantity index value and a second residual quantity index value, the first residual quantity index value being related to a residual quantity of the first colorant, the second residual quantity index value being related to a residual quantity of the second colorant, and wherein the second residual quantity index value indicate that the residual quantity of the second colorant is larger than that of the first colorant.

4. The image processing apparatus according to claim 1, wherein the specifying the distribution of color values specifies number of pixels in each of a plurality of partial ranges as the distribution of color values, the plurality of partial ranges being obtained by dividing an entire range of values which the color values are able to have, the plurality of partial ranges including a first partial range and a second partial range, and wherein the setting the characteristic information sets the first characteristic information such that a first rate differs from a second rate, the first rate being a rate of a first output value relative to a first input value correlated therewith by the first characteristic information, the first input value being within a first range with respect to the plurality of color component values, the first range corresponding to the first partial range, the second rate being a rate of a second output value relative to a second input value correlated therewith by the first characteristic information, the second input value being within a second range with respect to the plurality of color component values, the second range corresponding to the second partial range.

5. The image processing apparatus according to claim 4, wherein the setting the specific range sets the specific range to a particular range with respect to the plurality of color component values, the particular range corresponding to a partial range whose number of pixels is largest among the plurality of partial ranges.

6. The image processing apparatus according to claim 4, wherein the setting the specific range sets the specific range to a particular range with respect to the plurality of color component values, the particular range corresponding to a partial range whose number of pixels is least among the plurality of partial ranges.

7. The image processing apparatus according to claim 1, wherein the setting characteristic information includes:

calculating a plurality of specific rates corresponding to respective ones of the plurality of types of colorant, each of the plurality of specific rates indicating a rate of an estimated total consumption quantity of corresponding type of colorant relative to that of a specific one of the plurality of types of colorant, the estimated total consumption quantity being a total consumption quantity when assuming that the generating the print data is performed without performing the changing the plurality of color component values, the total consumption quantity being a total quantity consumed for printing the target image; and setting the first characteristic information and the second characteristic information such that a consumption reduction amount of one colorant is larger than that of another colorant whose specific rate is smaller than that of the one colorant, the consumption reduction amount being a reduction amount of the colorant consumption quantity as a result of the changing the plurality of color component values.

8. The image processing apparatus according to claim 1, wherein the specifying the distribution of color values specifies number of pixels in each of a plurality of partial ranges as the distribution of color values, the plurality of partial ranges being obtained by dividing an entire range of values which the color values are able to have, wherein the setting the specific range sets the specific range using one selected from a plurality of setting processes by a user, the plurality of setting processes including:

a first process in which the specific range is set to a first particular range with respect to the plurality of color component values, the first particular range corresponding to a partial range whose number of pixels is largest among the plurality of partial ranges; and a second process in which the specific range is set to a second particular range with respect to the plurality of color component values, the second particular range corresponding to a partial range whose number of pixels is least among the plurality of partial ranges, and wherein the setting characteristic information sets the first characteristic information such that a consumption reduction amount within the specific range is larger than that within a range other than the specific range, the consumption reduction amount being a reduction amount of the colorant consumption quantity as a result of the changing the plurality of color component values.

9. The image processing apparatus according to claim 1, wherein the setting the characteristic information includes:

determining whether or not a specific rate is greater than a reference rate, the specific rate being a rate of number of specific pixels relative to number of the plurality of pixels in the target image data, the specific pixel being a pixel having a particular color component value in the specific color space, the particular color component value indicating that the colorant consumption quantity for the particular color component value is maximum; and setting, in response to determination that the specific rate is greater than the reference rate, the characteristic information such that a consumption reduction amount for the specific pixel is larger than that for a pixel other than the specific pixel, the consumption reduction amount being a reduction amount of the colorant consumption quantity as a result of the changing the plurality of color component values.

10. A non-transitory computer readable storage medium storing a set of program instructions for an image processing apparatus comprising a controller, the set of program instructions, when executed by the controller, causing the image processing apparatus to perform:

acquiring target image data representing a target image to be printed by a printer using a plurality of types of colorant, the target image data including a plurality of pixels, the plurality of types of colorant including a first colorant and a second colorant;

acquiring a plurality of color component values in a specific color space of each of the plurality of pixels from the target image data, the specific color space being represented by a plurality of color components corresponding to respective ones of the plurality of types of colorant, the plurality of color components including a first color component corresponding to the first colorant and a second color component corresponding to the second colorant, the plurality of color component values including a first color component value for the first color component and a second color component value for the second color component;

specifying a distribution of color values of the plurality of pixels in the target image data by analyzing the target image data;

setting a specific range with respect to the plurality of color component values on the basis of the distribution of color values;

specifying a plurality of index values corresponding to respective ones of the plurality of types of colorant, each of the plurality of index values being related to a quantity of corresponding type of colorant, the plurality of index values including a first index value and a second index value, the first index value being related to a quantity of the first colorant, the second index value being related to a quantity of the second colorant;

setting characteristic information including first characteristic information and second characteristic information which correlate input values in the specific color space with output values in the specific color space on a one-to-one basis, the input values including a specific input value within the specific range, the specific input value being correlated with a first specific output value by the first characteristic information, the specific input value being correlated with a second specific output value by the second characteristic information, the first specific output value indicating that a colorant consumption quantity for the specific input value is changed from an original colorant consumption quantity for the specific input value by a first colorant quantity, the original colorant consumption quantity being a colorant consumption quantity when assuming that each of the output values is in coincidence with corresponding input value, the second specific output value indicating that the colorant consumption quantity for the specific input value is changed from the original colorant consumption quantity for the specific input value by a second colorant quantity different from the first colorant quantity, at least one of the first characteristic information and the second characteristic information being set on the basis of the specific range in the setting the characteristic information; and converting the target image data using the characteristic information for generating print data, the print data being supplied to the printer, the converting the target image data including changing the plurality of color component values of each of the plurality of pixels in the target image, the changing the plurality of color component values including:

changing the first color component value of each of the plurality of pixels as the input value to a first output color component value as the output value according to the first characteristic information; and changing, when the second index value indicates that the quantity of the second colorant differs from the quantity of the first colorant, the second color component value of each of the plurality of pixels as the input value to a second output color component value as the output value according to the second characteristic information.

\* \* \* \* \*